(12) United States Patent
Huang et al.

(10) Patent No.: US 11,760,036 B2
(45) Date of Patent: Sep. 19, 2023

(54) SYSTEMS AND METHODS FOR INDUCTION WELDING

(71) Applicant: Rohr, Inc., Chula Vista, CA (US)

(72) Inventors: Jonathan S. Huang, Pasadena, CA (US); Jeffrey D. Woods, Beaumont, CA (US); Andrew Adan, Corona, CA (US); Robert Lechner, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 17/554,908

(22) Filed: Dec. 17, 2021

(65) Prior Publication Data
US 2023/0191717 A1 Jun. 22, 2023

(51) Int. Cl.
*B29C 65/00* (2006.01)
*B29C 65/32* (2006.01)

(52) U.S. Cl.
CPC .............. *B29C 66/83* (2013.01); *B29C 65/32* (2013.01); *B29C 66/7392* (2013.01)

(58) Field of Classification Search
CPC ......... B29C 66/83; B29C 65/32; B29C 65/46; B23K 13/01; B23K 13/015; B23K 13/02; B64C 1/064; B64C 1/065; B64C 3/18–187
See application file for complete search history.

(56) References Cited

U.S. PATENT DOCUMENTS

| | | | |
|---|---|---|---|
| 5,047,605 A | 9/1991 | Ogden | |
| 5,660,669 A | 8/1997 | Mittleider | |
| 6,602,810 B1* | 8/2003 | Christensen | ...... B29C 66/73921 442/232 |
| 10,029,426 B2 | 7/2018 | Jessrang | |
| 2016/0375629 A1* | 12/2016 | Matsen | .................. B29C 65/04 156/245 |
| 2020/0094991 A1* | 3/2020 | Datas | ...................... B21J 15/42 |

OTHER PUBLICATIONS

EP search report for EP22213243.3 dated Apr. 25, 2023.

* cited by examiner

*Primary Examiner* — Carson Gross
(74) *Attorney, Agent, or Firm* — GETZ BALICH LLC

(57) ABSTRACT

An induction welding system includes a first gantry, a second gantry, and a support structure. The first gantry includes a first frame and a first plurality of trunks. The first plurality of trunks defines a first curved inner support surface of the first gantry. The first curved inner support surface has a first curvature geometry. The second gantry includes a second frame and a second plurality of trunks. The second plurality of trunks defines a second curved inner support surface of the second gantry. The second curved inner support surface has a second curvature geometry which is different than the first curvature geometry. The support structure includes at least one tooling member defining a curved outer support surface of the support structure. The support structure is longitudinally moveable relative to the first gantry and the second gantry.

10 Claims, 7 Drawing Sheets

SYSTEMS AND METHODS FOR INDUCTION WELDING

BACKGROUND

1. Technical Field

This disclosure relates generally to induction welding and, more particularly, to fixtures and method for induction welding a workpiece.

2. Background Information

A workpiece may be induction welded to bond members of that workpiece together. Various fixtures are known in the art for induction welding. Typically, an induction welding fixture is specifically tailored for induction welding a single joint on the workpiece. Therefore, a workpiece with multiple weld joints may require multiple different fixtures. Alternatively, a single fixture may be configured with multiple stations for induction welding the workpiece at different locations. Such a multi-station fixture may be arranged with the workpiece such that an induction welding coil can weld the workpiece without moving the workpiece or the fixture. While the known fixtures have various benefits, these fixtures may be expensive to produce and tedious to setup for induction welding. There is a need in the art therefore for a more versatile fixture for induction welding.

SUMMARY

It should be understood that any or all of the features or embodiments described herein can be used or combined in any combination with each and every other feature or embodiment described herein unless expressly noted otherwise.

According to an aspect of the present disclosure, an induction welding station includes a support structure including at least one tooling member defining a curved outer support surface of the support structure. The induction welding station further includes a gantry including a frame and a plurality of trunks. Each of the plurality of trunks is connected to and repositionable on the frame. The plurality of trunks defines a curved inner support surface of the gantry with the curved inner support surface facing the curved outer support surface. The support structure and the gantry are configured to secure a workpiece vertically between the curved outer support surface and the curved inner support surface during induction welding of the workpiece.

In any of the aspects or embodiments described above and herein, a first curvature of the curved outer support surface may extend from a first lateral outer end of the curved outer support surface to a second lateral outer end of the curved outer support surface and a second curvature of the curved inner support surface may extend from a first lateral inner end of the curved inner support surface to a second lateral inner end of the curved inner support surface.

In any of the aspects or embodiments described above and herein, the induction welding station may further include an induction welder track at least partially surrounding the gantry and an end effector moveably mounted to the induction welder track. The end effector may include an induction coil assembly including an induction welding coil configured for induction welding of the workpiece.

In any of the aspects or embodiments described above and herein, the end effector may be configured to move along the induction welder track with the induction welding coil positioned within the gantry.

In any of the aspects or embodiments described above and herein, the frame may include a first beam and a second beam and the plurality of trunks may include a first trunk and a second trunk. The first trunk may be connected to and repositionable on the first beam and the second trunk may be connected to and repositionable on the second beam. The first trunk may be longitudinally separated from the second trunk by a channel configured to receive the induction welding coil for induction welding the workpiece secured between the curved outer support surface and the curved inner support surface.

In any of the aspects or embodiments described above and herein, the gantry may be vertically moveable relative to the support structure between a first vertical position, in which the support structure and the gantry are configured to clamp a primary member of the workpiece and a secondary member of the workpiece vertically between the curved outer support surface and the curved inner support surface, and a second vertical position which is vertically spaced from the first vertical position.

In any of the aspects or embodiments described above and herein, the at least one tooling member may include a curved channel configured to retain the secondary member of the workpiece therein.

In any of the aspects or embodiments described above and herein, the support structure may include at least one actuator positioned within the curved channel. The at least one actuator may be configured to support at least a portion of the secondary member of the workpiece.

In any of the aspects or embodiments described above and herein, the support structure may be configured to be coupled to at least one rail and to move along the at least one rail.

In any of the aspects or embodiments described above and herein, the support structure may be moveable relative to the gantry in a longitudinal direction along the at least one rail.

According to another aspect of the present disclosure, an induction welding system includes a first gantry, a second gantry, and a support structure. The first gantry includes a first frame and a first plurality of trunks. The first plurality of trunks defines a first curved inner support surface of the first gantry. The first curved inner support surface has a first curvature geometry. The second gantry includes a second frame and a second plurality of trunks. The second plurality of trunks defines a second curved inner support surface of the second gantry. The second curved inner support surface has a second curvature geometry which is different than the first curvature geometry. The support structure includes at least one tooling member defining a curved outer support surface of the support structure. The support structure is longitudinally moveable relative to the first gantry and the second gantry between a first longitudinal position, in which the support structure and the first gantry are configured to secure a first portion of a workpiece vertically between the curved outer support surface and the first curved inner support surface during induction welding of the workpiece, and a second longitudinal position, in which the support structure and the second gantry are configured to secure a second portion of a workpiece vertically between the curved outer support surface and the second curved inner support surface during induction welding of the workpiece.

In any of the aspects or embodiments described above and herein, the induction welding system may further include at least one rail extending through the first gantry and the second gantry. The support structure may be coupled to the rail and configured to move along the rail relative to the first gantry and the second gantry.

In any of the aspects or embodiments described above and herein, the induction welding system may further include a first induction welder track at least partially surrounding the first gantry and a first end effector moveably mounted to the first induction welder track. The first end effector may include a first induction coil assembly including a first induction welding coil configured for induction welding of the workpiece. The first end effector may be configured to move along the first induction welder track in a first circumferential direction to induction weld the workpiece with the first induction welding coil along the first curvature geometry.

In any of the aspects or embodiments described above and herein, the induction welding system may further include a second induction welder track at least partially surrounding the second gantry and a second end effector moveably mounted to the second induction welder track. The second end effector may include a second induction coil assembly including a second induction welding coil configured for induction welding of the workpiece. The second end effector may be configured to move along the second induction welder track in a second circumferential direction to induction weld the workpiece with the second induction welding coil along the second curvature geometry.

According to another aspect of the present disclosure, an induction welding method includes arranging a support structure and a workpiece together. The support structure includes at least one tooling member defining a curved outer support surface of the support structure in contact with the workpiece. The method further includes securing a first longitudinal portion of the workpiece vertically between the support structure and a first gantry including a first frame and a first plurality of trunks connected to and repositionable on the first frame. The first plurality of trunks defines a first curved inner support surface of the first gantry. The first curved inner support surface has a first curvature geometry. The method further includes induction welding a primary member of the workpiece to a first secondary member of the workpiece using an induction welding coil while the workpiece is vertically secured between the curved outer support surface and the first curved inner support surface. The method further includes securing a second longitudinal portion of the workpiece vertically between the support structure and a second gantry including a second frame and a second plurality of trunks connected to and repositionable on the second frame. The second plurality of trunks defines a second curved inner support surface of the second gantry. The second curved inner support surface has a second curvature geometry which is different than the first curvature geometry.

In any of the aspects or embodiments described above and herein, the method may further include induction welding the primary member of the workpiece to the first secondary member of the workpiece, subsequent to securing the second longitudinal portion of the workpiece, using the induction welding coil while the workpiece is vertically secured between the curved outer support surface and the second curved inner support surface.

In any of the aspects or embodiments described above and herein, the method may further include induction welding the primary member of the workpiece to a second secondary member of the workpiece, subsequent to securing the second longitudinal portion of the workpiece, using the induction welding coil while the workpiece is vertically secured between the curved outer support surface and the second curved inner support surface.

In any of the aspects or embodiments described above and herein, the method may further include moving the arranged support structure and workpiece from the first gantry to the second gantry.

In any of the aspects or embodiments described above and herein, securing the first longitudinal portion of the workpiece vertically between the support structure and the first gantry may include vertically moving the first gantry relative to the support structure.

In any of the aspects or embodiments described above and herein, induction welding the primary member of the workpiece to the first secondary member of the workpiece may include positioning the induction welding coil in a gap defined longitudinally between a first trunk of the plurality of trunks and a second trunk of the plurality of trunks.

The present disclosure, and all its aspects, embodiments and advantages associated therewith will become more readily apparent in view of the detailed description provided below, including the accompanying drawings.

DETAILED DESCRIPTION

Figure 1:
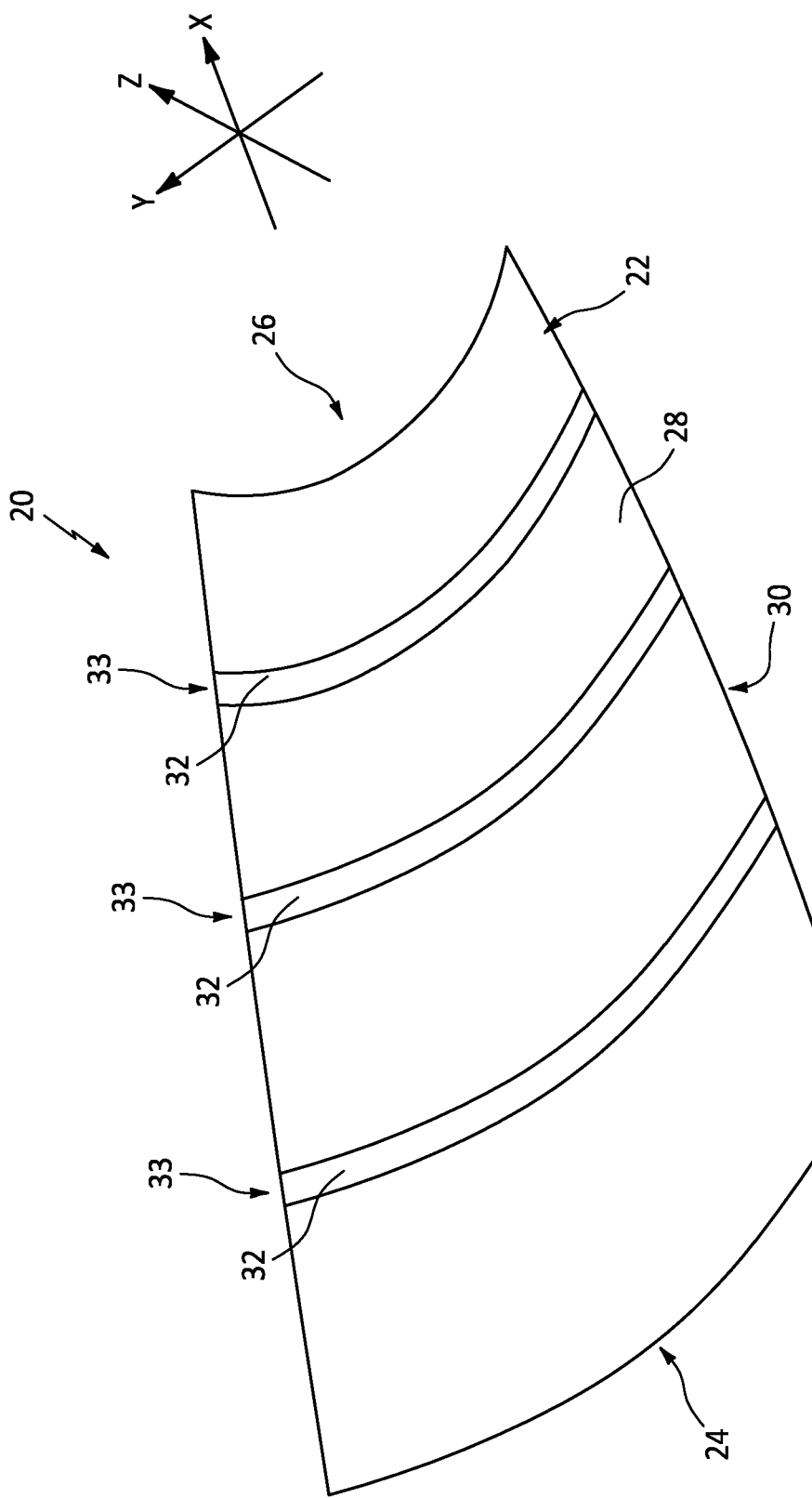
FIG. 1 illustrates a perspective view of a skin including a plurality of stiffeners, in accordance with one or more embodiments of the present disclosure.

The present disclosure is directed to a system and method for induction welding of a workpiece. To facilitate the description herein, embodiments of the present disclosure induction welding system and method will primarily be described as they may be used for indication welding of a generally curved workpiece having a curvature geometry which may vary along the workpiece in one or more directions. FIG. 1 illustrates an example of such a workpiece 20. The workpiece 20 illustrated in FIG. 1 is a circumferential portion of a stiffened skin configured for use, for example, in a cowl or nacelle structure of an engine (e.g., a gas turbine engine) for an aircraft. The workpiece 20 includes a primary member 22 (e.g., a skin) which generally extends longitudinally (e.g., along the x-axis) between a first longitudinal end 24 and a second longitudinal end 26. The primary member 22 includes an interior surface 28 and an exterior surface 30 each extending between the first longitudinal end 24 and the second longitudinal end 26. The primary member 22 has a curvature generally defined about the x-axis (e.g., the interior surface 28 may have a generally concave shape relative to the x-axis). Thus, as shown in FIG. 1, the workpiece 20 and/or the primary member 22 has a curvature geometry which varies between the first longitudinal end 24 and the second longitudinal end 26 of the primary member 22. To be clear, the components, configuration, and orientation of the workpiece 20 of FIG. 1 are exemplary and the present disclosure induction welding system and method of the present disclosure are not limited to use with the exemplary workpiece 20 of FIG. 1.

The workpiece 20 shown in FIG. 1 includes one or more secondary members 32 (e.g., stiffeners) mounted (e.g., welded) to the interior surface 28 of the primary member 22 and generally extending laterally (e.g., along the y-axis) and in a circumferential direction relative to the x-axis. Each of the secondary members 32 are longitudinally spaced from one another along the interior surface 28 of the primary member 22. Accordingly, each secondary member 32 may be mounted to the primary member 22 at a longitudinal portion 33 of the workpiece 20 which may have a different curvature geometry in comparison to one or more other longitudinal portions 33 associated with one or more other secondary members 32 of the workpiece 20.

Components (or "members") of the workpiece 20, such as the primary member 22 and the secondary members 32 shown in FIG. 1, may be made from a composite material. For example, the primary member 22 and the secondary members 32 may be made from a thermoplastic matrix composite material. Examples of a thermoplastic matrix include, but are not limited to, polyphenylene sulfide (PPS), polyetherimide (PEI), polyether ether ketone (PEEK), polyetherketoneketone (PEKK), polyaryletherketone (PAEK). In some embodiments, the thermoplastic matrix composite material may be a fiber-reinforced thermoplastic matrix composite material. Examples of fiber-reinforcement include, but are not limited to, fiberglass, carbon fiber, and para-aramid synthetic fiber (e.g., KEVLAR material). This fiber-reinforcement may be in the form or a woven or non-woven fabric (e.g., fiber mat, woven fiber cloth, fiber tape, etc.) and/or chopped fibers, which may include long grain chopped fiber and/or short grain chopped fibers.

Figure 2:
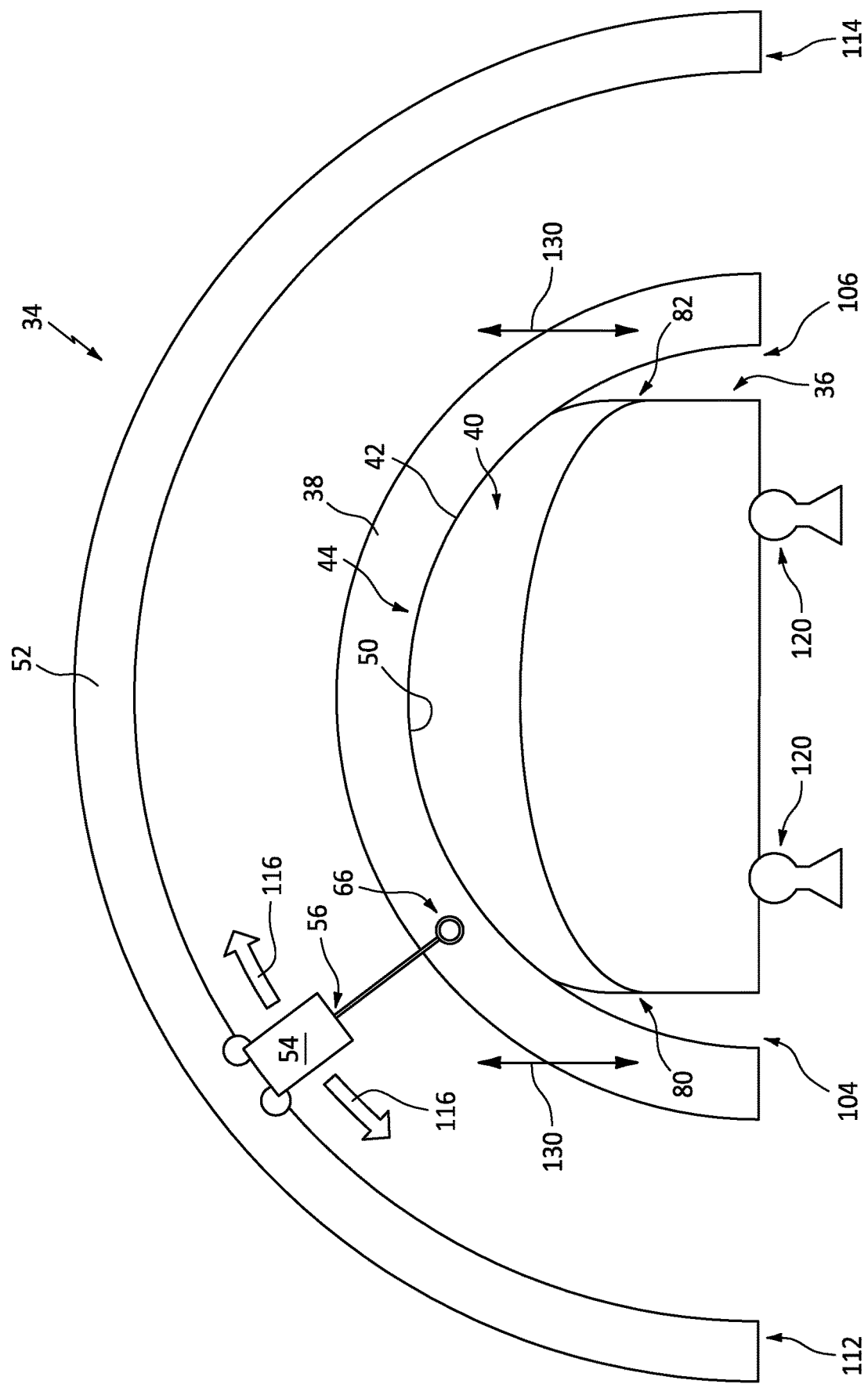
FIG. 2 illustrates a schematic view of an induction welding station, in accordance with one or more embodiments of the present disclosure.
Figure 3:
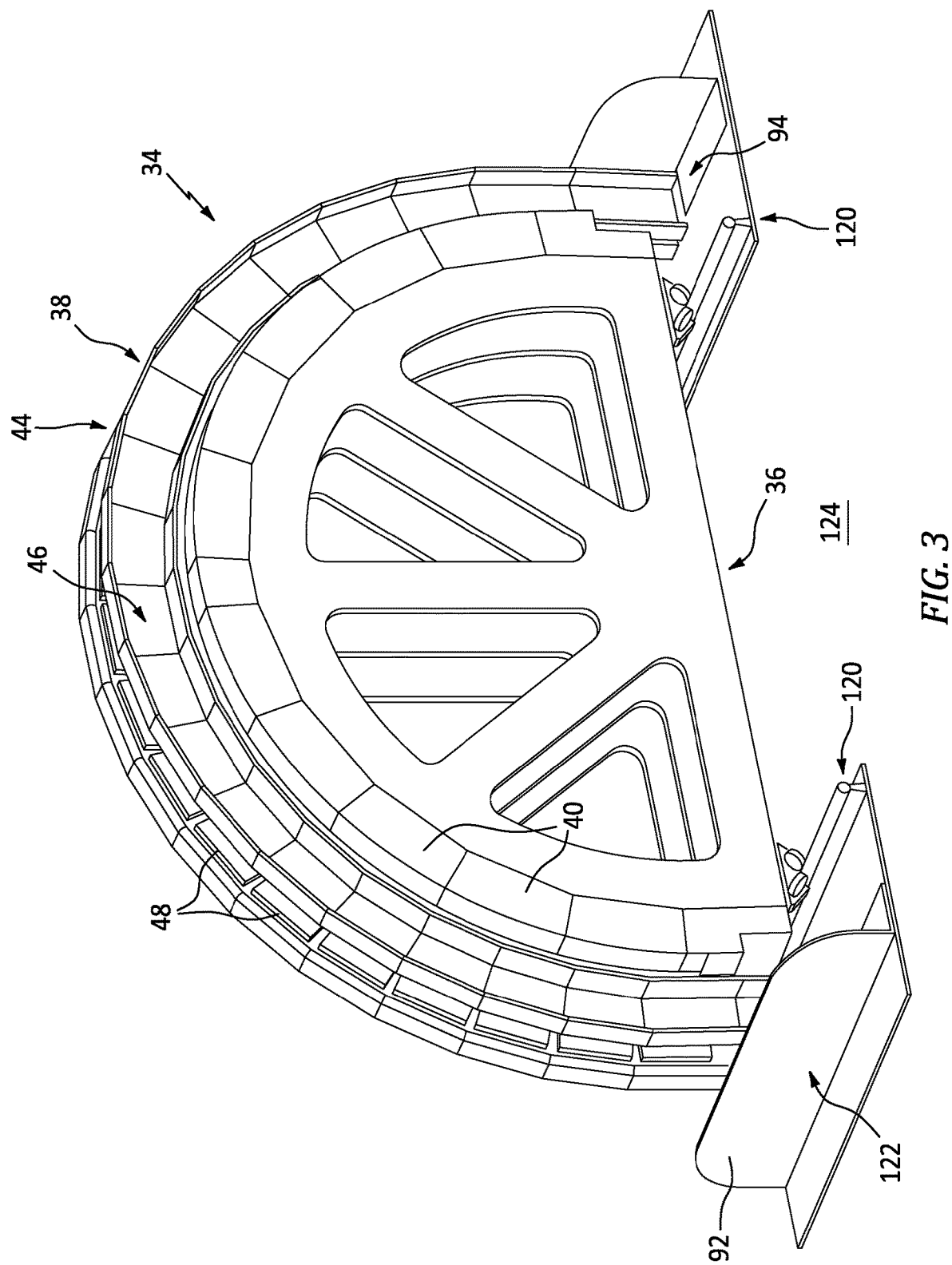
FIG. 3 illustrates a perspective view of a portion of an induction welding station, in accordance with one or more embodiments of the present disclosure.

Referring to FIGS. 2 and 3, an induction welding station 34 according to the present disclosure is illustrated. The induction welding station 34 includes a first support structure 36 and a gantry 38. The first support structure 36 includes at least one tooling member 40 (e.g., tooling blocks) defining a curved outer support surface 42 of the first support structure 36. The gantry 38 includes a second support structure 44 including a frame 46 and a plurality of trunks 48. Each trunk 48 of the plurality of trunks 48 may be connected to and repositionable on the frame 46. The plurality of trunks 48 define a curved inner support surface 50 of the gantry 38. As will be discussed in further detail, the first support structure 36 and the second support structure 44 of the gantry 38 are configured to secure the workpiece 20 vertically between the curved outer support surface 42 and the curved inner support surface 50 during induction welding of the workpiece 20.

The induction welding station 34 further includes a curved induction welder track 52 at least partially surrounding the gantry 38. An end effector 54 is moveably mounted to the induction welder track 52. The end effector 54 includes an induction welder 56 configured for induction welding the workpiece 20. More particularly, the induction welder 56 is configured to induction weld two or more members of the workpiece 20, such as the workpiece members 22, 32 of the workpiece 20 together, which workpiece members 22, 32 may be (e.g., discretely formed) thermoplastic bodies or any other type of induction weldable bodies.

Figure 4:
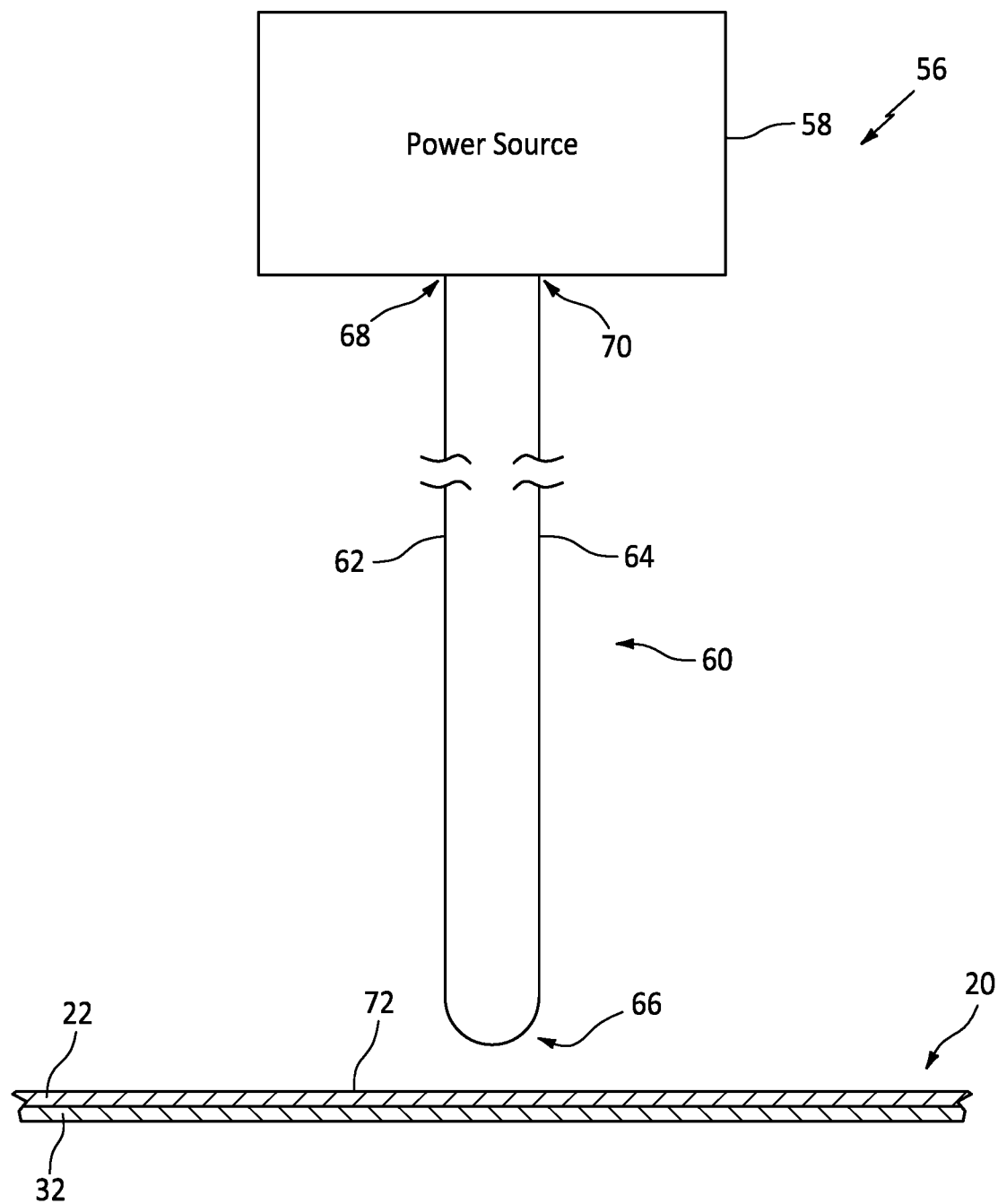
FIG. 4 illustrates a schematic view of an induction welder positioned proximate a workpiece, in accordance with one or more embodiments of the present disclosure.
Figure 5:
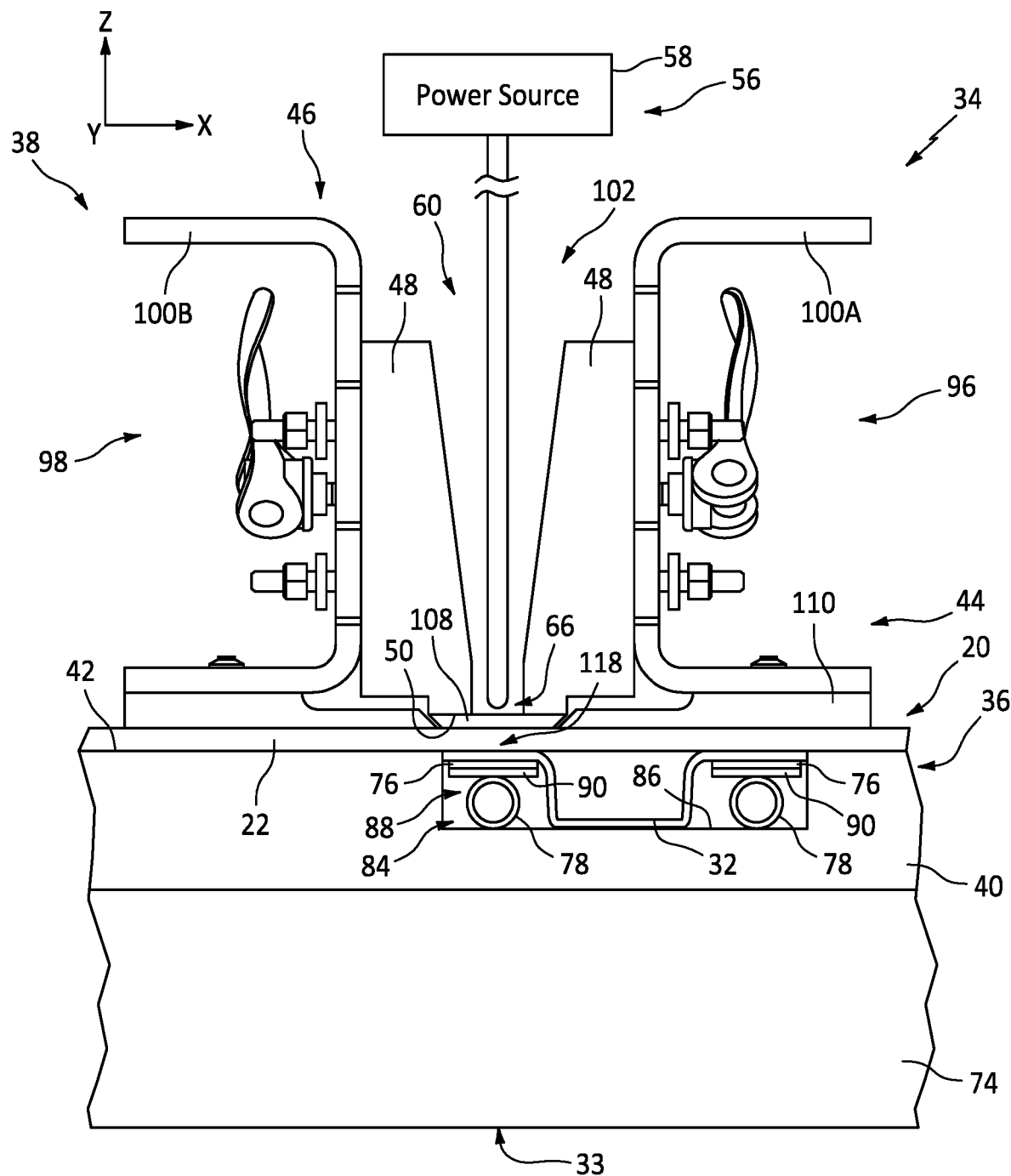
FIG. 5 illustrates a cross-sectional view of a circumferential portion of the induction welding station of FIG. 2 taken along Line 5-5, in accordance with one or more embodiments of the present disclosure.

Referring to FIGS. 4 and 5, the induction welder 56 includes a power source 58 and an induction coil assembly 60. The power source 58 is configured to generate a periodic electrical current. The power source 58, for example, may be configured as a high-frequency current source. The power source 58 may be or otherwise include an alternating current (AC) generator, transformer, amplifier, etc. Alternatively, the power source 58 may include a direct current (DC) generator, transformer, amplifier, battery, etc. electrically coupled with an oscillator. The present disclosure, however, is not limited to such exemplary power sources.

The induction coil assembly 60 includes an electrical first lead 62, an electrical second lead 64, and an induction welding coil 66. The first lead 62 may be arranged parallel with the second lead 64. The first lead 62 and the second lead 64 are connected to opposing ends of the induction welding coil 66. The first lead 62 and the second lead 64 electrically couple the induction welding coil 66 to respective terminals 68 and 70 of the power source 58. The induction welding coil 66 may be configured to substantially match an exterior surface 72 contour of the workpiece 20 to be induction welded. The induction welding coil 66, for example, may be straight where the workpiece 20 has a flat exterior surface 72. The induction welding coil 66 may alternatively be non-straight (e.g., curved, compound, etc.) where the workpiece exterior surface 72 is non-straight (e.g., curved, compound, etc.). The present disclosure, however, is not limited to the foregoing exemplary induction welding coil 66 configurations.

Referring to FIGS. 2, 3, and 5, the first support structure 36 and the second support structure 44 are configured to position and secure (e.g., temporarily, fixedly hold) the workpiece 20 in preparation for and during induction welding. More particularly, the first support structure 36 and the second support structure 44 are configured to position and secure the workpiece members 22, 32 together while those members 22, 32 are induction welded together using the induction welding coil 66.

FIG. 5 illustrates a cross-sectional view of a circumferential portion of the induction welding station 34 of FIG. 3 and including a portion of the induction welder 56. The first support structure 36 includes a support structure base 74 having the at least one tooling member 40 detachably mounted thereto to define the curved outer support surface 42. The curved outer support surface 42 extends from a first lateral outer end 80 of the curved outer support surface 42 to a second lateral outer end 82 of the curved outer support surface 42 and has a curvature extending therebetween which corresponds to a curvature geometry of the workpiece 20 at a longitudinal portion 33 where the primary member 22 of the workpiece 20 is assembled with a secondary member 32 of the workpiece 20 (e.g., at a location where the primary member 22 will be welded to the secondary member 32).

In some embodiments, the at least one tooling member 40 may define at least one curved channel 84 which extends along at least a portion of the curved outer support surface 42 from the first lateral outer end 80 to the second lateral outer end 82. The curved channel 84 may be configured to retain a secondary member 32 of the workpiece 20 therein. The first support structure 36 may further include one or more of a heat management device 76 (e.g., a heat sink or an insulator) and an actuator 78 which extend within the curved channel 84. The heat management device 76 and/or the actuator 78 may be positioned within the curved channel 84 and configured to support at least a portion of the respective secondary member 32 of the workpiece 20.

The at least one tooling member 40 may be constructed from a non-electrically conductive material. This non-electrically conductive material may be a polymer such as, but not limited to, polyurethane. The present disclosure, however, is not limited to the foregoing exemplary tooling member materials.

The heat management device 76 may be or may otherwise include a heat sink configured to absorb heat energy. The heat management device 76, for example, may be constructed from a ceramic material such as, but not limited to, aluminum silicate (also referred to as alumina silicate). The present disclosure, however, is not limited to the foregoing exemplary heat sink materials. Furthermore, in other embodiments, the heat management device 76 may be or may otherwise include an insulator. The heat management device 76, for example, may be configured to absorb and/or block transfer of heat energy.

The actuator 78 may be mated with (e.g., received within) the curved channel 84, and arranged between a bottom surface 86 of the curved channel 84 and the heat management device 76. The actuator 78 may be configured to push (e.g., bias) the heat management device 76 away from the bottom surface 86 of the curved channel 84. The actuator 78 of FIG. 5, for example, is configured as an expandable pressure vessel 88 (e.g., a fluid bladder such as, but not limited to, an expandable air tube, an expandable air bag, etc.). This pressure vessel 88 may be connected to a fluid source such as a compressed air reservoir (e.g., a tank) and/or an air pump. The pressure vessel 88 may be configured to receive fluid (e.g., compressed air) from the fluid source, where regulation of the fluid may cause the pressure vessel 88 to expand or contract in size, thereby adjustably supporting one or more circumferential portions of the secondary member 32 retained within the curved channel 84.

In some embodiments, a spacer 90 may be disposed within the curved channel 84 between the pressure vessel 88 and the heat management device 76. This spacer 90 may be configured to provide a thermal break/a thermal insulator between the heat management device 76 and the pressure vessel 88. The spacer 90, for example, may be constructed from a thermally insulating material such as, but not limited to, silicon.

The frame 46 of the second support structure 44 extends laterally between a first lateral inner end 92 and a second lateral inner end 94, and is curved between the first lateral end 92 and the second lateral end 94. The frame 46 extends longitudinally between a first side 96 and a second side 98. The frame 46 may include one or more frame beams 100A and 100B (generally referred to as "100"). The frame beams 100 are arranged parallel with one another. Each of the frame beams 100 extends laterally between and to (or about) the opposing frame lateral ends 92, 94 and are curved therebetween. The first beam 100A is arranged at (e.g., on, adjacent or proximate) the first side 96 of the frame 46. The second beam 100B is arranged at (e.g., on, adjacent or proximate) the second side 98 of the frame 46. The first beam 100A and the second beam 100B are longitudinally displaced from one another by an inter-beam channel 102 configured to receive the induction welding coil 66 for induction welding the workpiece 20 secured between the curved outer support surface 42 and the curved inner support surface 50.

The plurality of trunks 48 are arranged within the inter-beam channel 102. Each of the beams 100 of the frame 46 is configured with a set (e.g., a row) of one or more of the trunks 48 of the plurality of trunks 48. Each set of the trunks 48, for example, may be arranged end-to-end laterally along a respective one of the beams 100. Each trunk 48 of the plurality of trunks 48 is connected to the respective beam 100 in a repositionable manner and defines the curved inner support surface 50 of the second support structure 44. The curved inner support surface 50 extends from a first lateral inner end 104 of the curved inner support surface 50 to a second lateral inner end 106 of the curved inner support surface 50 and has a curvature extending therebetween which corresponds to the curvature geometry of the workpiece 20 at the longitudinal portion 33 where the primary member 22 of the workpiece 20 is assembled with the secondary member 32 of the workpiece 20 (e.g., at a location where the primary member 22 will be welded to the secondary member 32).

Each trunk 48 of the plurality of trunks 48 may be constructed from a non-electrically conductive material. This non-electrically conductive material may be a polymer such as, but not limited to, polyurethane. The present disclosure, however, is not limited to the foregoing exemplary trunk materials.

In some embodiments, the second support structure 44 may additionally include a heat sink 108 retained by a heat sink holder 110 mounted to the frame 46 and positioned between the frame 46 and the workpiece 20. The heat sink 108 may be positioned by the heat sink holder 110 between the curved inner support surface 50 and the workpiece 20. The heat sink 108 is configured as a component operable to absorb heat energy. The heat sink 108, for example, may be constructed from a ceramic such as, but not limited to, aluminum silicate (also referred to as alumina silicate). The present disclosure, however, is not limited to the foregoing exemplary top heat sink materials.

As previously discussed, the induction welding station 34 includes the end effector 54 which is moveably mounted to the induction welder track 52. The induction welder track 52 extends between a first lateral end 112 and a second lateral end 114, and is curved therebetween to substantially correspond to the curvature of the gantry 38. The induction welder track 52 is longitudinally aligned with and surrounds the gantry 38. Accordingly, the end effector 54 is configured to move along the induction welder track 52 in a substantially circumferential direction 116 between the first lateral end 112 and the second lateral end 114 while maintaining the induction welding coil 66 within the inter-beam channel 102 of the gantry 38. Accordingly, the induction welding coil 66 is configured to be positioned proximate a welding interface 118 between the primary member 22 and the secondary member 32 along the curvature geometry of the longitudinal portion 33 of the workpiece 20.

As shown in FIGS. 2 and 3, the support structure base 74 of the first support structure 36 may be configured to be coupled to at least one rail 120 and configured to move (e.g., translate) along the at least one rail 120. Accordingly, the first support structure 36 and the workpiece 20 arranged thereon may be moveable in the longitudinal direction relative to the gantry 38 and the induction welder track 52. With such an arrangement, the first support structure 36 may be moved within/into or out of the gantry 38 to provide additional adjustment and/or facilitate placement and/or removal of the workpiece 20. In some embodiments, support structure base 74 may include one or more wheels. The wheels may be operable to move freely on the floor 124. Alternatively, the wheels may run on one or more tracks. In some other embodiments, however, the support structure base 74 may be mounted on a (e.g., fixed, stationary) base structure (e.g., a mounting block).

As shown in FIGS. 2 and 3, the gantry 38 is configured to move vertically (e.g., along the z-axis substantially in the direction 130 shown in FIG. 2) along one or more tracks 122 (e.g., rails), which tracks 122 are disposed on opposing lateral sides of the base structure gantry 38 and connected to the floor 124. According, the gantry 38 is vertically moveable relative to the first support structure 36 and the workpiece 20 between a first vertical position, in which the first support structure 36 and the gantry 38 are configured to clamp the primary member 22 and the secondary member 32 of the workpiece 20 vertically between the curved outer support surface 42 and the curved inner support surface 50, and a second vertical position which is vertically spaced from (e.g., above) the first vertical position. One or more actuators (e.g., hydraulic cylinders) may be configured to move the gantry 38 along the tracks 122. Of course, in other embodiments, the gantry 38 may be manually moveable.

Figure 6:
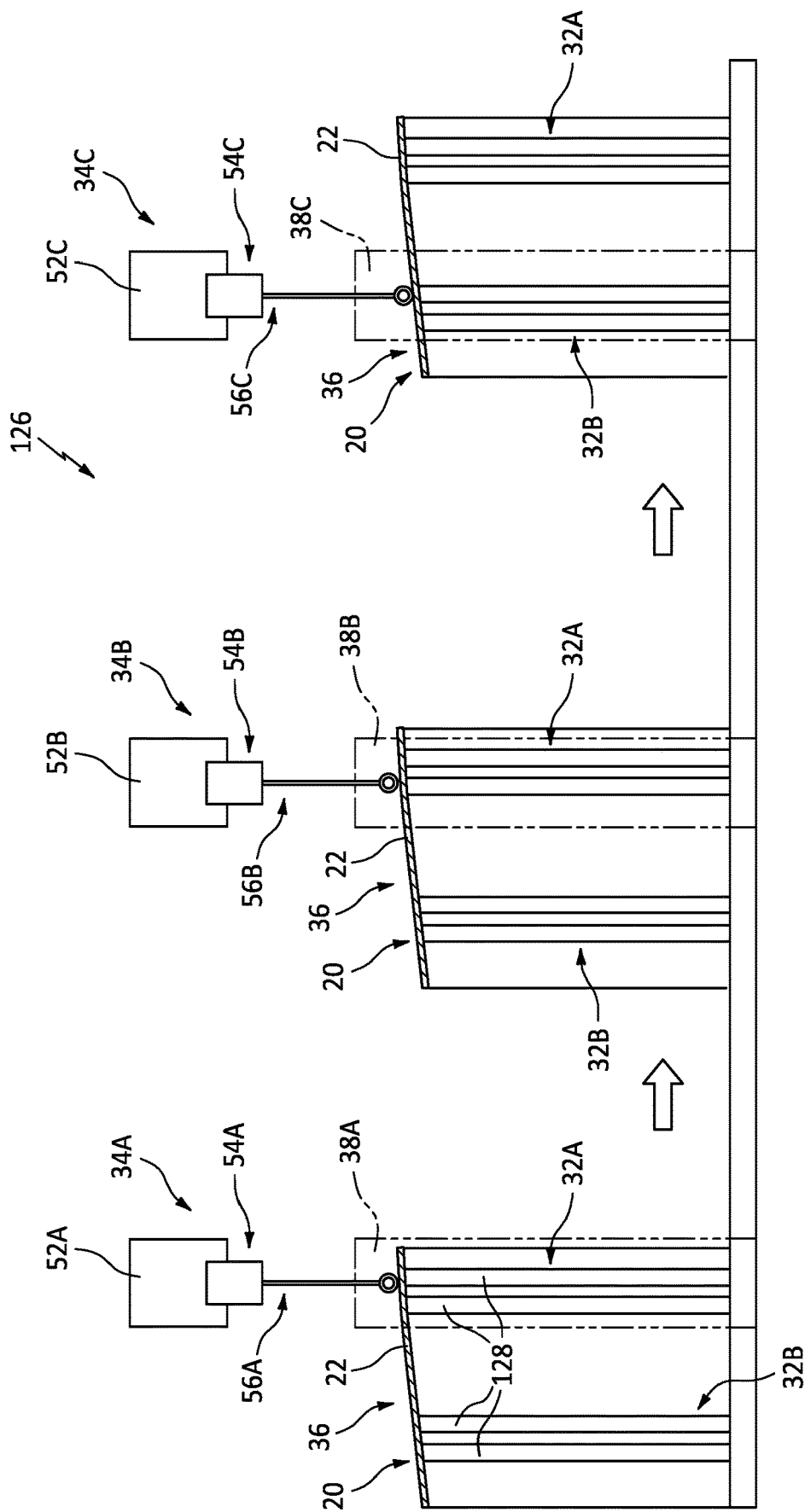
FIG. 6 illustrates a schematic view of an induction welding system including a plurality of induction welding stations, in accordance with one or more embodiments of the present disclosure.

Referring now to FIGS. 5 and 6, the present disclosure includes an induction welding system 126 which includes a plurality of induction welding stations 34 as shown in FIG. 6. Each induction welding station 34 of the plurality of induction welding stations 34 includes a gantry 38 and an end effector 54 movably mounted to an induction welder track 52 surrounding the respective gantry 38. The curved inner support surface 50 of the respective gantry 38 for each induction welding station 34 may have a curvature geometry which is different than the curvature geometry of the curved inner support surface 50 of the respective gantry 38 for one or more other induction welding stations 34 of the plurality of induction welding stations 34. Accordingly, the respective gantry 38 of each induction welding station 34 may be configured to be securely retain a uniquely shaped portion (e.g., a longitudinal portion) of the workpiece 20 during an induction welding operation that is different than other portions of the workpiece 20 configured to be securely retained by the respective gantries 38 of one or more other induction welding stations 34.

In one non-limiting example of the present disclosure induction welding system 126, the induction welding system of FIG. 6 includes a first induction welding station 34A, a second induction welding station 34B, and a third induction welding station 34C. Each of the induction welding stations 34A, 34B, 34C includes a respective gantry 38A, 38B, 38C. Each of the induction welding stations 34A, 34B, 34C further includes a respective induction welder track 52A, 52B, 52C and associated end effector 54A, 54B, 54C including a respective induction welder 56A, 56B, 56C. The first support structure 36 and workpiece 20 assembled thereon is illustrated experiencing a sequence of induction welds at each of the induction welding stations 34A-C. Portions of the workpiece members 22, 32 have been omitted for clarity. The workpiece 20 of FIG. 6 includes the primary member 22 which is a composite skin (e.g., a thermoplastic matrix composite skin for an aircraft). The workpiece of FIG. 6 further includes secondary members 32A, 32B which are "hat-type" stiffeners (see, e.g., FIG. 5). Each of the secondary members 32A, 32B includes a pair of flange portions 128 configured to be induction welded to the primary member 22 to form a stiffened skin. Each secondary member 32A, 32B and/or each flange portion 128 of the secondary members 32A, 32B may be positioned on a portion of the primary member 22 which has a curvature geometry which is different than other portions of the primary member 22 in which other secondary members 32A, 32B and/or flange portions 128 of the secondary members 32A, 32B may be positioned. Accordingly, the present disclosure induction welding system 126 allows an entire workpiece (e.g., the workpiece 20) to be assembled and induction welded without the need for retooling the workpiece for individual induction weld locations and without requiring readjustment of a single gantry and/or second support structure 44. Accordingly, the rate at which multiple workpieces having similar complex curvatures can be induction welded may be greatly increased.

Figure 7:
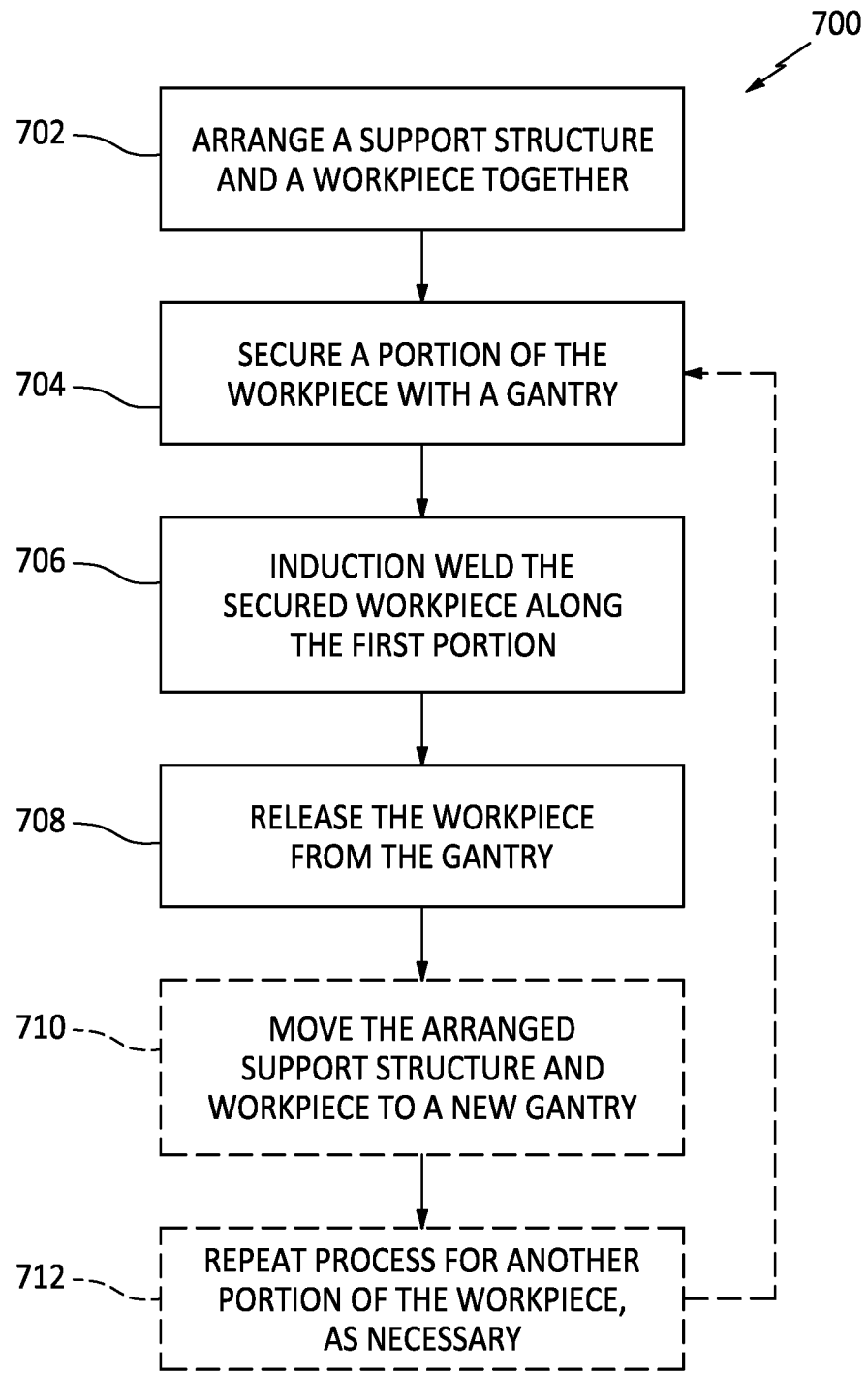
FIG. 7 illustrates a flowchart for an induction welding method, in accordance with one or more embodiments of the present disclosure.

FIG. 7 is a flowchart of a method 700 for induction welding a workpiece (e.g., the workpiece 20). The method 700 may be performed using an induction welding stations and/or system such as, but not limited to, the induction welding station 34 of FIGS. 2-5 and/or the induction welding system 126 of FIG. 6.

In step 702, the first support structure 36 and the members 22, 32 of the workpiece 20 are arranged together (see, e.g., FIG. 5). A portion of the primary member 22 may vertically overlap (e.g., lap) a portion of the secondary members 32.

In step 704, the workpiece 20 is secured vertically between the first support structure 36 and the second support structure 44 of the gantry 38 for a particular induction welding station 34. The first support structure 36, for example, may be moved along the tracks 122 until the workpiece 20 is properly positioned relative to the gantry 38 for the particular induction weld to be performed. Referring to 5, the heat sink holder 110 may vertically contact the exterior surface 72 of the workpiece 20. The heat sink 108 may also abut vertically against and contact the exterior surface 72 of the workpiece 20. The plurality of trunks 48 may be adjusted vertically such that the trunks 48 engage (e.g., contact) the heat sink 108. The plurality of trunks 48 may thereby provide a backstop for the heat sink 108 as well as retain the heat sink 108 against the workpiece 20.

The actuator 78 may be actuated (e.g., inflated) to move (e.g., push) the heat management device 76 and/or the spacer 90 upwards within the curved channel 84 toward the workpiece 20. This movement may cause the heat management device 76 to vertically engage (e.g., contact) at least the workpiece 20 at a bottom side thereof. The actuator 78 may be actuated further such that the workpiece 20 and its overlapping members 22, 32 are pressed (e.g., clamped) vertically between the support structures 36, 44 and their respective heat management device 76 and heat sink 108.

In step 706, the workpiece 20 is induction welded. The induction welding coil 66, for example, may be arranged in the inter-beam channel 102 between the plurality of trunks 48 such that the induction welding coil 66 is slightly elevated (e.g., spaced) from the heat sink 108. Once in position, the power source 58 (see FIG. 5) may provide a high frequency (e.g., alternating) current to the induction welding coil 66. The induction welding coil 66 may subsequently generate electromagnetic waves which excite one or more reinforcement fibers within the primary workpiece member 22 via eddy currents and/or one or more of reinforcement fibers within the adjacent secondary workpiece member 32 via eddy currents. This excitation may elevate a temperature of the primary member 22 and/or the adjacent secondary member 32 to a melting point temperature where a polymer (e.g., thermoplastic) matrix of the primary member 22 and/or a polymer (e.g., thermoplastic) matrix of the secondary member 32 melts. Referring to FIG. 5, a melt layer may form at welding interface 118 (e.g., a weld joint/seam) between the primary member 22 and the secondary member 32. This melt layer may bond the primary member 22 and the secondary member 32 together upon cooling thereof. The induction welding coil 66 may be moved generally laterally (e.g., in the y-axis direction) and along the curvature of the workpiece 20 to provide an elongated welded seam between the primary member 22 and the secondary member 32. As the induction welding coil 66 moves laterally, the induction welding coil 66 translates within the inter-beam channel 102.

By securing the workpiece 20 between the support structures 36, 44 during the induction welding process, the induction welding station 34 may maintain contact between the workpiece members 22, 32 being welded together. The induction welding station 34 may also maintain a compressive force across the overlap joint between the workpiece members 22, 32 to facilitate improved fusion.

In step 708, the gantry 38, and hence the second support structure 44, is repositioned (e.g., vertically raised relative to the workpiece 20) to release the workpiece 20 from the induction welding station 34. The actuator 78, for example, may be actuated (e.g., deflated) such that the heat management device 76 moves (e.g., inwards) away from the workpiece 20. If no further induction welding of the workpiece 20 is necessary, the now fused workpiece 20 may be removed from the first support structure 36. Alternatively, in step 710, the first support structure 36 and the workpiece 20 assembled thereon may be moved to a new gantry 38 to induction weld the workpiece 20 at another location (e.g., another longitudinal portion of the workpiece 20 having a different curvature geometry). The steps 704, 706, 708, and 710 may be repeated as necessary to perform the remaining induction welds for the workpiece 20. For example, the workpiece members 22, 32 may be welded together again at the other location to provide another weld seam.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. An induction welding system comprising:
   a first gantry including a first frame and a first plurality of trunks, the first plurality of trunks defining a first curved inner support surface of the first gantry, the first curved inner support surface having a first curvature geometry;
   a second gantry including a second frame and a second plurality of trunks, the second plurality of trunks defining a second curved inner support surface of the second gantry, the second curved inner support surface having a second curvature geometry which is different than the first curvature geometry; and
   a support structure including at least one tooling member defining a curved outer support surface of the support structure, the support structure longitudinally moveable relative to the first gantry and the second gantry between a first longitudinal position, in which the support structure and the first gantry are configured to secure a first portion of a workpiece vertically between the curved outer support surface and the first curved inner support surface during induction welding of the workpiece, and a second longitudinal position, in which the support structure and the second gantry are configured to secure a second portion of a workpiece vertically between the curved outer support surface and the second curved inner support surface during induction welding of the workpiece.

2. The induction welding system of claim 1, further comprising at least one rail extending through the first gantry and the second gantry, the support structure coupled to the rail and configured to move along the rail relative to the first gantry and the second gantry.

3. The induction welding system of claim 1, further comprising:
   a first induction welder track at least partially surrounding the first gantry; and
   a first end effector moveably mounted to the first induction welder track, the first end effector comprising a first induction coil assembly including a first induction welding coil configured for induction welding of the workpiece, the first end effector configured to move along the first induction welder track in a first circumferential direction to induction weld the workpiece with the first induction welding coil along the first curvature geometry.

4. The induction welding system of claim 3, further comprising:
- a second induction welder track at least partially surrounding the second gantry; and
- a second end effector moveably mounted to the second induction welder track, the second end effector comprising a second induction coil assembly including a second induction welding coil configured for induction welding of the workpiece, the second end effector configured to move along the second induction welder track in a second circumferential direction to induction weld the workpiece with the second induction welding coil along the second curvature geometry.

5. An induction welding method comprising:
- arranging a support structure and a workpiece together, the support structure including at least one tooling member defining a curved outer support surface of the support structure in contact with the workpiece;
- securing a first longitudinal portion of the workpiece vertically between the support structure and a first gantry including a first frame and a first plurality of trunks connected to and repositionable on the first frame, the first plurality of trunks defining a first curved inner support surface of the first gantry, the first curved inner support surface having a first curvature geometry;
- induction welding a primary member of the workpiece to a first secondary member of the workpiece using an induction welding coil while the workpiece is vertically secured between the curved outer support surface and the first curved inner support surface; and
- securing a second longitudinal portion of the workpiece vertically between the support structure and a second gantry including a second frame and a second plurality of trunks connected to and repositionable on the second frame, the second plurality of trunks defining a second curved inner support surface of the second gantry, the second curved inner support surface having a second curvature geometry which is different than the first curvature geometry.

6. The method of claim 5, further comprising induction welding the primary member of the workpiece to the first secondary member of the workpiece, subsequent to securing the second longitudinal portion of the workpiece, using the induction welding coil while the workpiece is vertically secured between the curved outer support surface and the second curved inner support surface.

7. The method of claim 5, further comprising induction welding the primary member of the workpiece to a second secondary member of the workpiece, subsequent to securing the second longitudinal portion of the workpiece, using the induction welding coil while the workpiece is vertically secured between the curved outer support surface and the second curved inner support surface.

8. The method of claim 5, further comprising moving the arranged support structure and workpiece from the first gantry to the second gantry.

9. The method of claim 5, wherein securing the first longitudinal portion of the workpiece vertically between the support structure and the first gantry includes vertically moving the first gantry relative to the support structure.

10. The method of claim 5, wherein induction welding the primary member of the workpiece to the first secondary member of the workpiece includes positioning the induction welding coil in a gap defined longitudinally between a first trunk of the plurality of trunks and a second trunk of the plurality of trunks.

* * * * *